United States Patent [19]

Kashubara

[11] Patent Number: 4,915,584

[45] Date of Patent: Apr. 10, 1990

[54] WIND DEVICE WITH AN OSCILLATING BLADE

[76] Inventor: Daniel Kashubara, 8803 N. Palmyra Rd., Canfield, Ohio 44406

[21] Appl. No.: 230,912

[22] Filed: Aug. 11, 1988

[51] Int. Cl.$^4$ ................................................ F03D 5/00
[52] U.S. Cl. ........................................ 416/64; 416/80
[58] Field of Search ................................. 416/64–66, 416/68, 83, 80

[56] References Cited

U.S. PATENT DOCUMENTS

| | | | |
|---|---|---|---|
| 1,553,177 | 9/1925 | Kulmer | 416/66 |
| 3,040,976 | 6/1962 | De Mattos | 416/66 X |
| 3,995,972 | 12/1976 | Nassar | 416/68 |
| 4,097,190 | 6/1978 | White | 416/117 |
| 4,347,036 | 8/1982 | Arnold | 416/64 X |

FOREIGN PATENT DOCUMENTS

| | | | |
|---|---|---|---|
| 3522995 | 1/1987 | Fed. Rep. of Germany | 416/66 |
| 510435 | 12/1920 | France | 416/64 |
| 290681 | 11/1931 | Italy | 416/64 |
| 192695 | 11/1984 | Japan | 416/64 |

*Primary Examiner*—Everette A. Powell, Jr.
*Attorney, Agent, or Firm*—Harpman & Harpman

[57] ABSTRACT

An apparatus for converting air flow into mechanical motion using a single variable direction airfoil movable within a vertical track. Change in vertical direction of the airfoil and associated angle of attack is self-determined within a pre-set range dependent on work requirement.

2 Claims, 2 Drawing Sheets

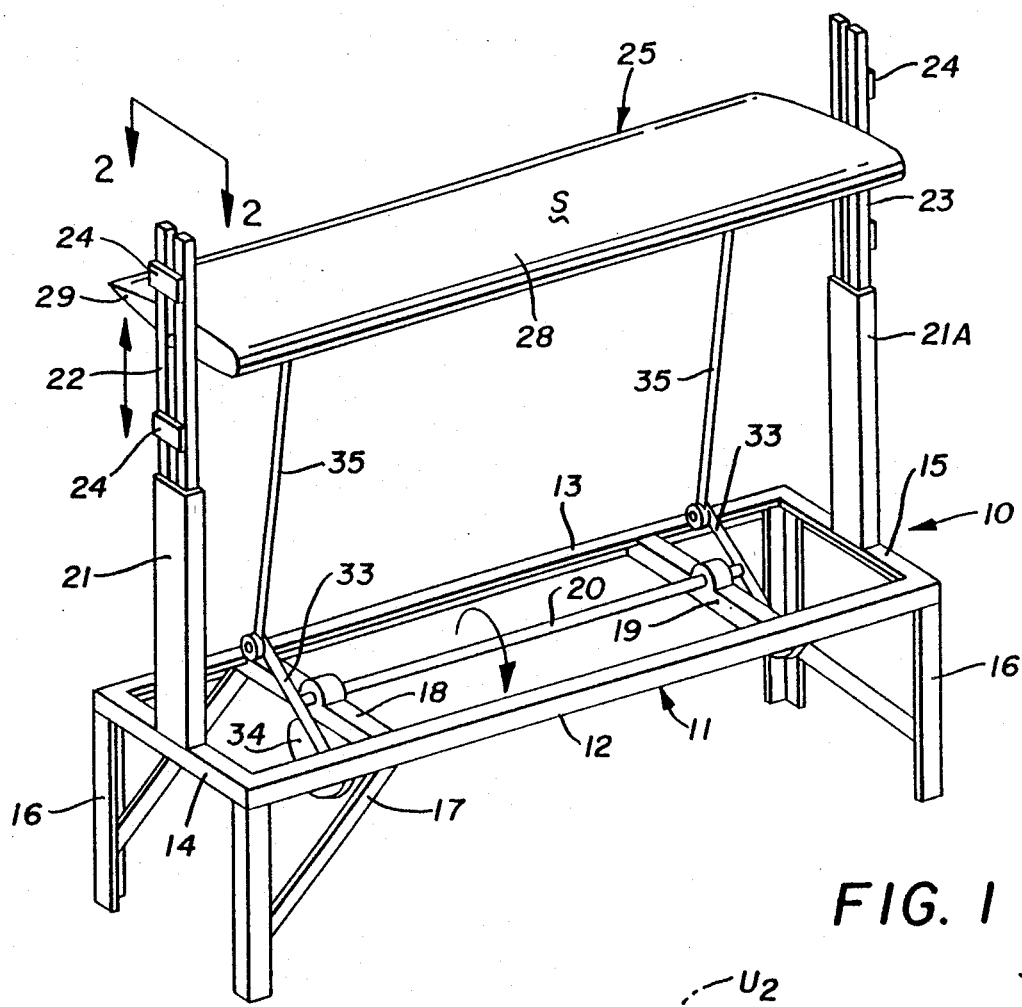
FIG. 1
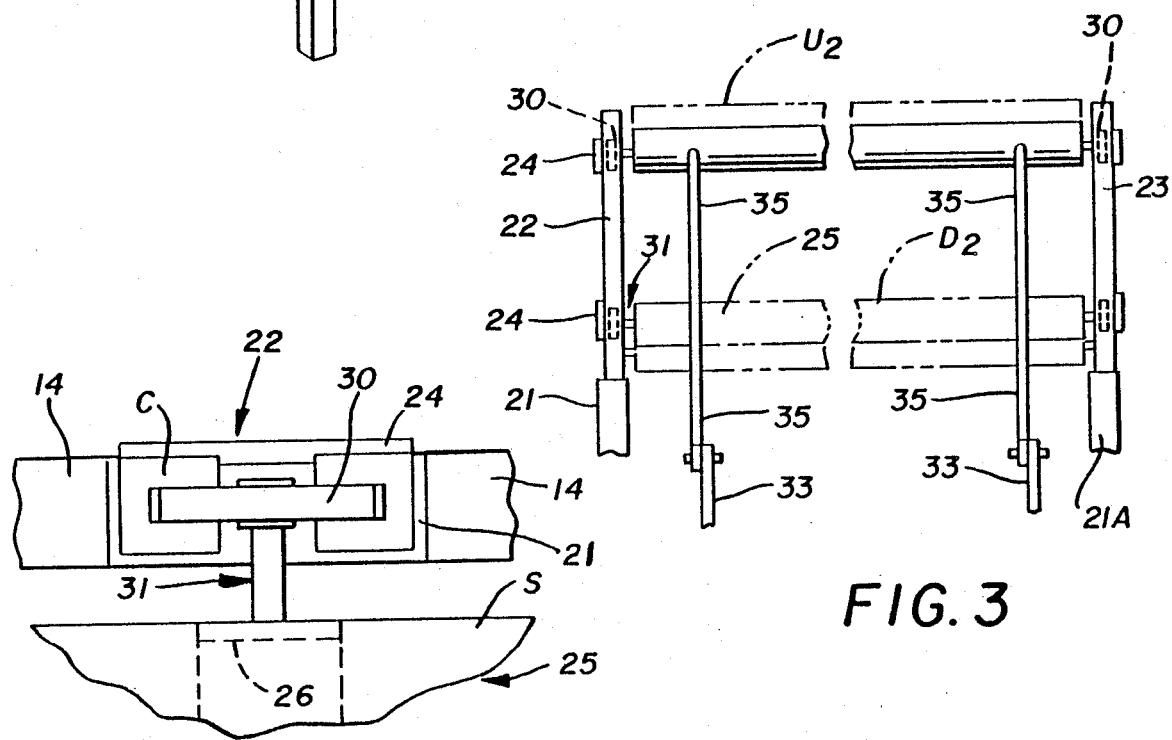
FIG. 2
FIG. 3

WIND DEVICE WITH AN OSCILLATING BLADE

BACKGROUND OF THE INVENTION

1. Technical Field:

This device relates to windmill type apparatus that convert air velocity and movement into mechanical motion that can be used for a variety of useful pursuits. Multiple shaped blades are driven by &he wind usually in a rotary fashion and can be combined with gear reduction units to enhance the power output therefrom.

2. Description of Prior Art:

Prior Art devices of this type have relied on a variety of different blade and airfoil designs that are engaged and moved by the wind, see for example U.S. Pat. Nos. 3,895,872, 4,097,190 and U.S. Pat. No. 4,347,036.

In U.S. Pat. No. 3,995,972 a wind machine with reciprocating blades is disclosed which has a plurality of reciprocating blades that move vertically on a pair of spaced guide rods. Each blade is pivoted about its longitudinal axis mounting means and is correspondingly directionally reversed by changing its angle of attack about its pivot point by a resilient cushion engaging the blade at its maximum point of travel within the cycle.

U.S. Pat. No. 4,097,190 discloses a wind motor having blade rotating on a crank assembly with an offset counter weight. The blade is characterized by a power stroke and a return stroke driving the blade and associated counter weight crank assembly around a drive axle.

U.S. Pat. No. 4,347,036 describes a fluid energy converter method and apparatus in which the kinetic energy of moving air is converted into useful motion. A plurality of vertically aligned and spaced airfoils utilize a flutter phenomenon in which a rapid flutter oscillation of the foil occurs within a limited parameter which can be achieved with less wind velocity required than for a single large movable blade. A control system is used in which each foil has a pair of electrical coils to generate alternating current by their rapid oscillation within a modified armature.

SUMMARY OF THE INVENTION

A single airfoil device to convert air flow into useful mechanical motion using a variable angle of attack airfoil dependent on the reciprocal vertical direction of the foil within a restricted guide &rack. Pivoted off center cranks and connecting rods affixed to the foil to vary the attack angle within the reciprocal motion.

DESCRIPTION OF THE DRAWINGS

FIG. 1 is a perspective view of the wind device in operation;

FIG. 2 is an enlarged broken away view on lines 2—2 of FIG. 1;

FIG. 3 is a diagramacal illustration of the travel pass of the airfoil and related crank assembly position;

DESCRIPTION OF THE PREFERRED EMBODIMENT

Figure 4:
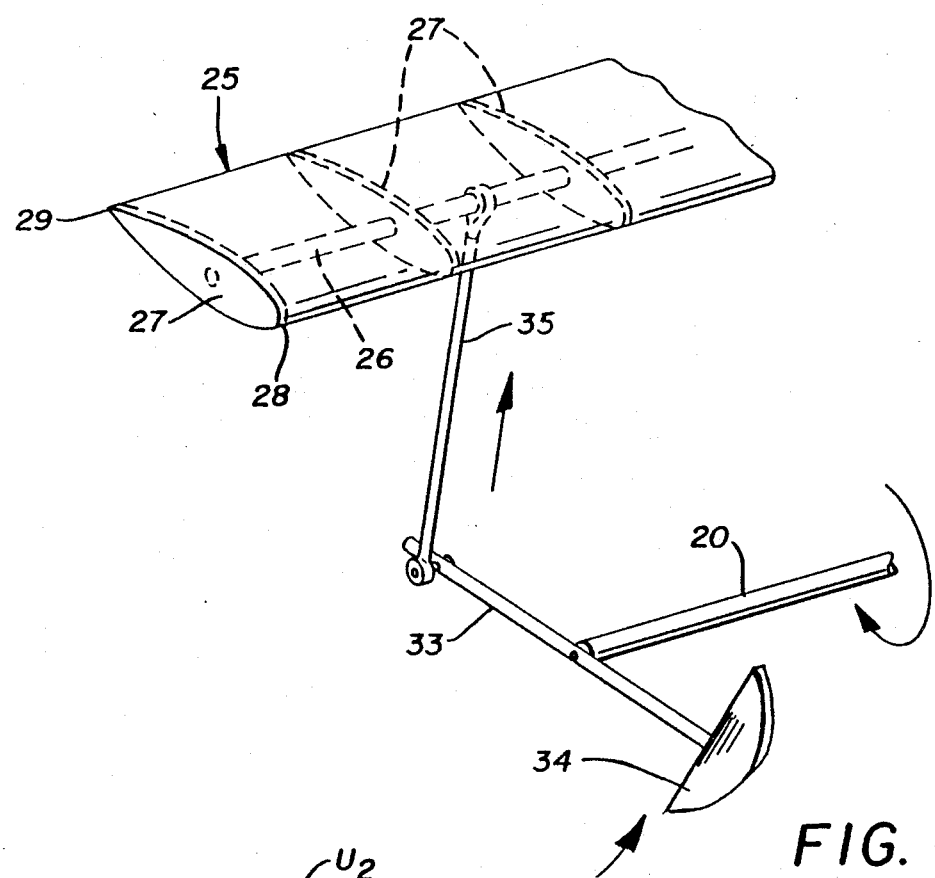
FIG. 4 is an enlarged broken away perspective view of a portion of the airfoil and related crank assembly.

Referring now to FIG. 1 of the drawings, a wind device can be seen having a support frame 10 comprised of a rectangular support base 11 having spaced parallel rails 12 and 13 and a pair of interconnecting end rails 14 and 15 secured to the respective free ends of said parallel rails 12 and 13 with a plurality of support legs 16, each of which extends from the intersection of said above referred to rails. Diagonal braces 17 interconnect and stabilize each of said legs 16 with the rectangular support frame 11 as is well known in the art. A pair of transversely extending cross members 18 and 19 are positioned on said rectangular support base 11. A axle 20 is rotatably secured to the cross members 18 and 19 and will become, under operational conditions, the power take off to be used to drive any type of associated mechanism required.

A pair of oppositely disposed track supports 21 and 21A extend vertically from the respective rails 14 and 15 midway along their length and have vertically ascending guide tracks 22 and 23 respectively extending therefrom. Each of said guide tracks has parallel U-shaped channels facing one another with multiple interconnecting brackets 24 holding said U-shaped channels in spaced parallel relation to one another.

Referring now to FIGS. 1, 2, 4 and 5 of the drawings, an airfoil 25 can be seen having a longitudinal spar 28 and a number of spaced contoured ribs 27 along its length. Each of the contoured ribs 27 defines in cross-sectionally distinctive wing shape of the foil which is characterized by a rounded leading edge 28 and a tapered trailing edge 29. The wing shape is symmetrical in cross-section and as such requires no further explanation or descriptions to those skilled in the art.

The contoured ribs 27 are encased with a surface forming material defining the airfoil's surface S. A guide reel 30 and axle assembly 31 extends independently from the respective free ends of said spar 26 and are of a determined size so as to register within the adjacent guide tracks as best seen in FIG. 2 of the drawings affording free vertical and axial movement of said airfoil 25 within the guide tracks 22 and 23.

A airfoil support assembly 32 comprises a pair of crank arms 23 each secured to the respective free ends of said axle 20. The contoured weight 34 is affixed to the other end of each of said crank arms 33 and connecting rods 35 are pivotally secured to the respective free ends of said crank arms 33. Each of the connecting rods 35 are affixed to the airfoil spar. 26, as best seen in FIG. 4 of the drawings.

Figure 5:
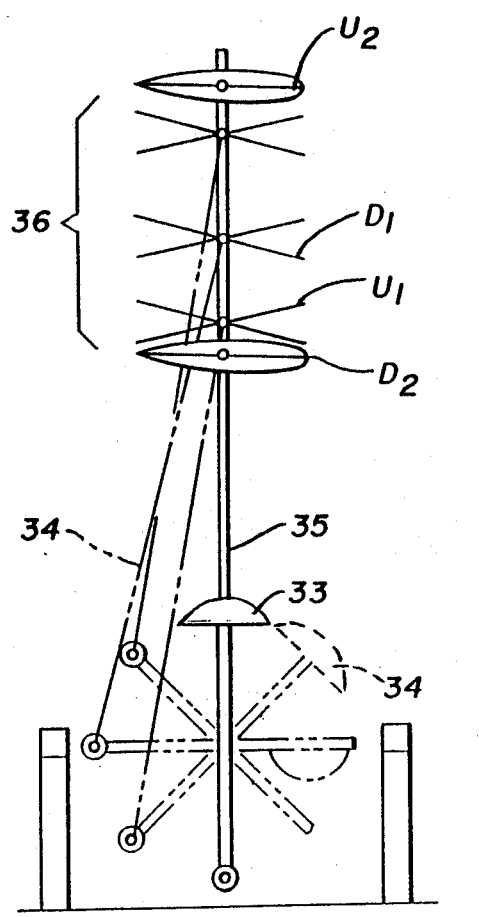
FIG. 5 is a diagramacal illustration of the variation of angles of attack of the airfoil and relative crank positions during movement.

Referring now to FIGS. 1, 3, and 5 of the drawings, the operation of the wind device is as follows. Upon engagement with a wind flow the airfoil 25 moves vertically either up or down dependent on the airfoil's position since the foils angle of attack is fixed around 12° either up or down depending on the position of the connecting rods relative the crank arms 33. As the airfoil moves down at D1, its angle of attack is 12° downwardly. As the airfoil reaches its lowest point at D2 the angle of attach is momentarily neutral as it passes D2. The angle of attack changes to 12° upwardly as the crank arm responds to the counter weight 34 moving the airfoil to a U1 position. The angle of attack changes again at the airfoil's highest point at U2 then being forced downwardly by the wind on the foil itself.

It will be evident from the above description that the airfoil is engaged and moved by the air flow over it between its lowest point at D2 and the highest point at U2, thus powering the airfoil and associated crank ar assembly within the limits of same and said guide tracks.

Referring, again, to FIG. 5 of the drawings the interim airfoil positions are indicated for both directions by 36D illustrating graphically the relative angles of attacks of the airfoil as it travels both upwardly in its vertical track and downwardly as hereinbefore described.

it can thus be seen that by the use of the off center crank which is rotatably secured midway along its length to the axle 20 that the connecting arms 33 are pivotally secured to the crank arm's free end thus defining a circular motion which when transferred into a restrictive vertical plane as defined by the restrictive vertical travel in the guide tracks of the airfoil will vary the airfoil s angle of attack by the nature of the crank configuration.

It is by this combination that the airfoil can, in reality, change its relative angle of attack to the air stream on its alternating reciprocating vertical strokes utilizing the force of the air against the respective surface S of the foil. The foil and associated support assembly are balanced by the counter weight to neutral no wind position shown in FIG. 5 at N.

Such a device, once activated, will maintain the vertical oscillations within the guide track provided as long as there is a constant air flow of a determined strength across its airfoil surface.

It will be evident that due to the foil's supporting structure that the actual angle of attack will change on each stroke as described above. A relative angle of attack for the foil into the airstream is inherent in the foils shape and fixed position will change as the air speed verses oscillation or foil reciprocation increases. Thus as the vertical oscillation accelerates, the efficiency of the foil decreases reaching a maximum oscillation speed thereby governing itself.

Thus, it will be seen that a new and novel windmill device has been illustrated and described and it will be apparent to those skilled in the art that various changes and modifications may be made therein without departing from the spirit of the invention.

Therefore, 1 claim:

1. A wind device comprised of a support frame, a pair of guide tracks extending vertically from said support frame, an airfoil positioned for vertical movement between said guide tracks, said airfoil comprising a longitudinal spar having spaced contoured ribs positioned thereon, surface material extending over said ribs defining a wing shape, an airfoil support assembly affixed to said longitudinal spar of said airfoil and movably secured to said support frame, said airfoil support assembly comprises an axle rotatably secured to said support frame, at least one crank arm secured to said axle, a connecting rod pivotally secured to said crank arm at one end and affixed to said longitudinal spar at its other end, a counter weight secured to said crank arm in spaced relation to said axle, means for pivoting and airfoil in said guide tracks.

2. The wind device of claim 1 wherein said airfoil has a wing shape characterized by leading round edge and a tapered trailing edge.

* * * * *